United States Patent [19]
Suzuki et al.

[11] Patent Number: 5,159,670
[45] Date of Patent: Oct. 27, 1992

[54] DISC DATA DISPLAY UNIT

[75] Inventors: Masami Suzuki; Koji Yamagishi; Junichi Yoshio, all of Saitama, Japan

[73] Assignee: Pioneer Electronic Corporation, Tokyo, Japan

[21] Appl. No.: 715,008

[22] Filed: Jun. 13, 1991

Related U.S. Application Data

[63] Continuation of Ser. No. 547,542, Jul. 3, 1990, abandoned, which is a continuation of Ser. No. 242,464, Sep. 9, 1988, abandoned.

[30] Foreign Application Priority Data

Mar. 9, 1988 [JP] Japan ............................. 63-055513

[51] Int. Cl.⁵ ............................................. G11B 17/00
[52] U.S. Cl. ..................................... 395/164; 369/34; 369/39
[58] Field of Search ....................... 369/34, 39, 27, 28, 369/30, 56, 57, 83; 364/200, 900; 395/162-164, 100

[56] References Cited

U.S. PATENT DOCUMENTS

| | | | |
|---|---|---|---|
| 4,538,253 | 8/1985 | Ishibashi et al. | 369/34 X |
| 4,539,663 | 9/1985 | Ishibashi et al. | 369/34 X |
| 4,594,700 | 6/1986 | Takahashi et al. | 369/39 |
| 4,722,078 | 1/1988 | Nakanishi et al. | 369/39 |
| 4,734,898 | 3/1988 | Morinaga | 369/39 |
| 4,766,581 | 8/1988 | Korn et al. | 369/34 X |
| 4,899,326 | 2/1990 | Takeya et al. | 369/36 |

FOREIGN PATENT DOCUMENTS 0081958 6/1983 European Pat. Off.
0198093 10/1986 European Pat. Off.

*Primary Examiner*—Heather R. Herndon
*Attorney, Agent, or Firm*—Sughrue, Mion, Zinn, Macpeak & Seas

[57] ABSTRACT

A disc data display unit provided separately from a disc player. In the display unit is, data inherent to a disc loaded in the disc player and data arbitrarily provided by the operator are stored in a memory medium to form an electronic file, so that the data on the disk will be displayed when the disc player is operated.

9 Claims, 2 Drawing Sheets

DISC DATA DISPLAY UNIT

This is a continuation of application Ser. No. 07/547,542 filed Jul. 3, 1990, which is a continuation application of application Ser. No. 07/242,464 filed Sep. 9, 1988 both now abandoned.

BACKGROUND OF THE INVENTION

1. Field of the Industrial Application

This invention relates to a disc data display unit used in combination with a disc player adapted to play a disc having data inherent therein, or TOC (table of contents) data such as a total performance time, and a total number of pieces of music. (Inherent data is data that has not been separately recorded, but rather exists as a result of the recording of the information data.)

2. Description of the Prior Art

Optical disc players are provided with display units built therein, so that, whenever a disc is played, data inherent to the disc are reproduced and displayed on the display unit. As a result, although data on a disc itself can be displayed, an electronic file for the inherent data on the disc can only be developed by the person using the disc by using, for example, a computer or the like on his own.

SUMMARY OF THE INVENTION

According to the invention, a disc data display unit is provided separately from a disc player. In the display unit, data inherent to a disc loaded in the disc player and data arbitrarily provided by the operator are stored in a memory medium to form an electronic file, so that the data on the disc will be displayed when the disc player is operated.

An object of this invention is to provide a disc data display unit which is located separately from a disc player, and in which data inherent in a disc loaded in the disc player are received to form a file, and data arbitrarily provided by the user (which will also be referred to as descriptive words) are added to the file, so that an original electronic file is formed.

The foregoing object of the invention has been achieved by the provision of a disc data display unit used in combination with a disc player adapted to play a disc having data inherent therein, which, according to the invention, comprises a memory for storing the inherent data of the disc in the form of a file in a memory medium; an input device for inputting arbitrary data, in correspondence to the inherent data, into the memory medium with the aid of the memory: discriminating apparatus for receiving the inherent data from the disc player, to subject the disc to discrimination; and an output device for displaying the corresponding arbitrary data obtained through the discrimination.

DETAILED DESCRIPTION OF THE PREFERRED EMBODIMENTS

Preferred embodiments of this invention will be described with reference to the accompanying drawings.

Figure 1:
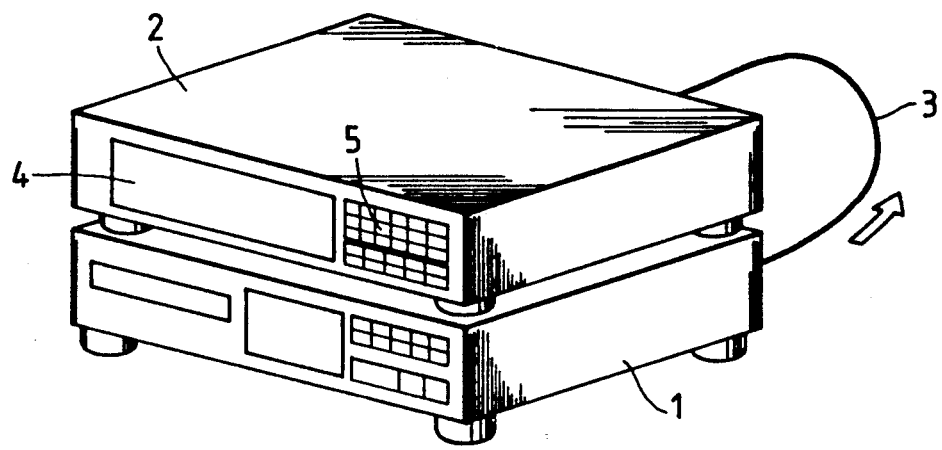
FIG. 1 is a perspective view showing a first embodiment of this invention.
Figure 2:
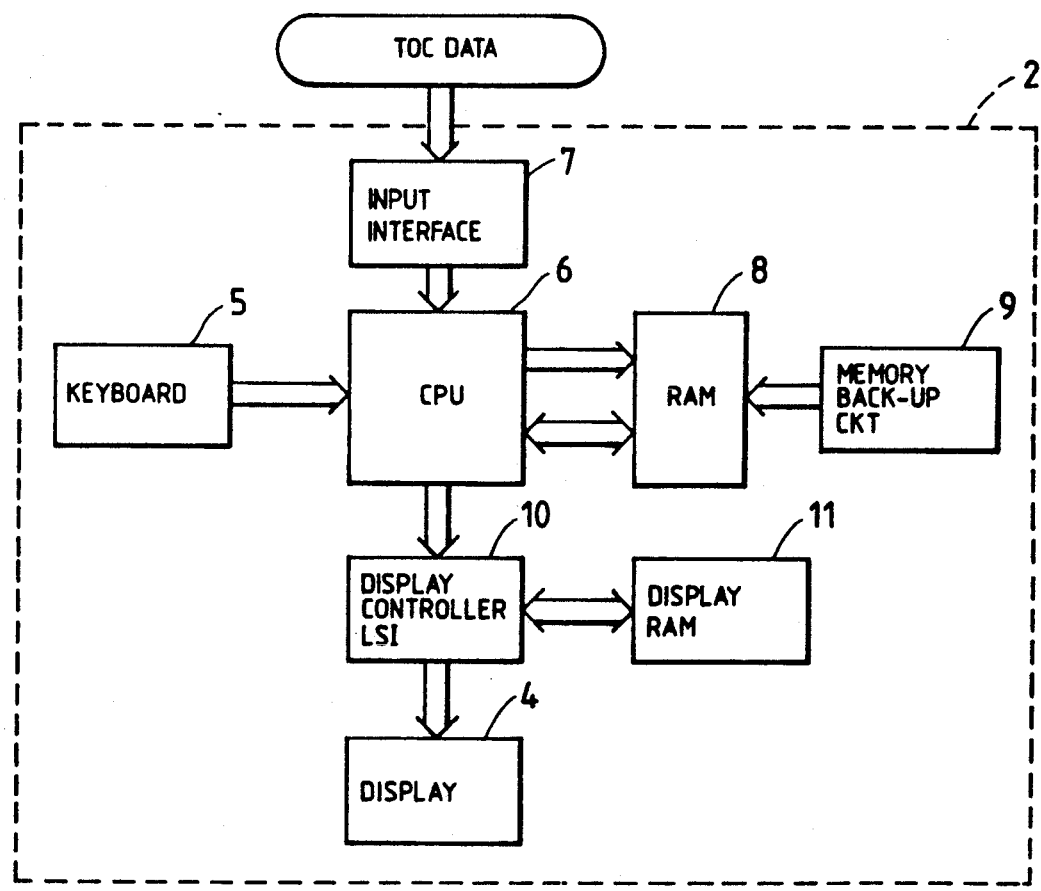
FIG. 2 is a block diagram showing the internal arrangement of the first embodiment of the invention.

A first example of a disc data display unit according to the invention is as shown in FIGS. 1 and 2. In FIG. 1, reference numeral 1 designates an optical disc player, and the disc data display unit is designated by reference numeral 2. When a disc is loaded in the optical disc player, TOC data are supplied through a signal transmitting cable 3 to the disc data display unit 2.

The disc data display unit 2 has a disc data displaying section 4 and an inputting keypad 5 disposed on the front wall thereof. The internal arrangement of the disc data display unit 2 is similar to that of a microcomputer. Data inherent in a disc are applied through the signal transmitting cable 3 to an input interface 7 and a CPU 6. The CPU 6 and a RAM 8 operate to read and write data. The RAM 8 is supported by a memory back-up circuit 9. The CPU 6 causes the displaying section 4 to convert data into characters with the aid of a display controller (of LSI construction) 10. The display controller 10 reads display characters from a display RAM 11 according to data applied thereto, and applies them to the displaying section 4. The CPU 6 can instruct the RAM 8 to store not only the data inherent to the disc, but also data inputted by means of the keypad 5 at the user's discretion.

The inherent data and the arbitrary data from the keypad 5 are inputted in the RAM 8 in the above-described manner. Therefore, when a disc is loaded in the disc player 1, the TOC data of the disc are applied to the disc data display unit 2, so that the inherent data equal in content to the TOC data are retrieved from the RAM 8. Upon retrieval of the inherent data, the keypad-inputted arbitrary data stored together with the inherent data in the RAM. such as a disc title and music name, are applied to the displaying section 4.

If the inherent data of the disc have not yet been stored in the RAM 8 then the CPU 6 operates to write the inherent data into the RAM. In this case, the keypad 5 is operated to input arbitrary data. As a result, the disc's inherent data and the arbitrary data are stored together in the RAM 8, and displayed on the displaying section 4. Thus, in the disc data display unit 2, the disc's inherent data file can be increasingly accumulated.

In the above-described embodiment the displaying section 4 is built in the disc data display unit 2. However, the displaying section 4 may be provided separately from the disc data display unit 2 and replaced by a television monitor so that disc data are displayed on the television monitor. Furthermore, in the above-described embodiment, the operator uses the keypad 5 to input arbitrary data; however, bar codes may be used or remote control signals may be transmitted, to input character data. Moreover, in the above-described embodiment, the memory medium is the RAM 8 supported by the back-up circuit 9; however, it goes without saying that other memory media may be employed.

Figure 3:
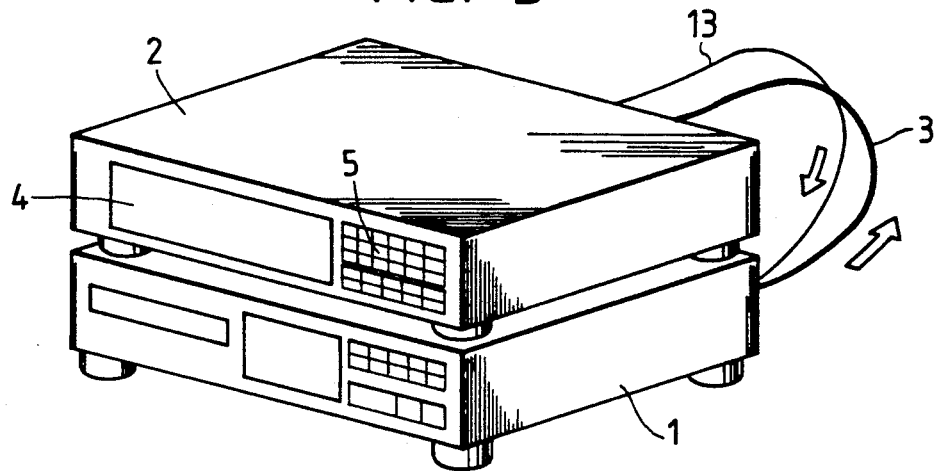
FIG. 3 is a perspective view of a second embodiment of the invention.
Figure 4:
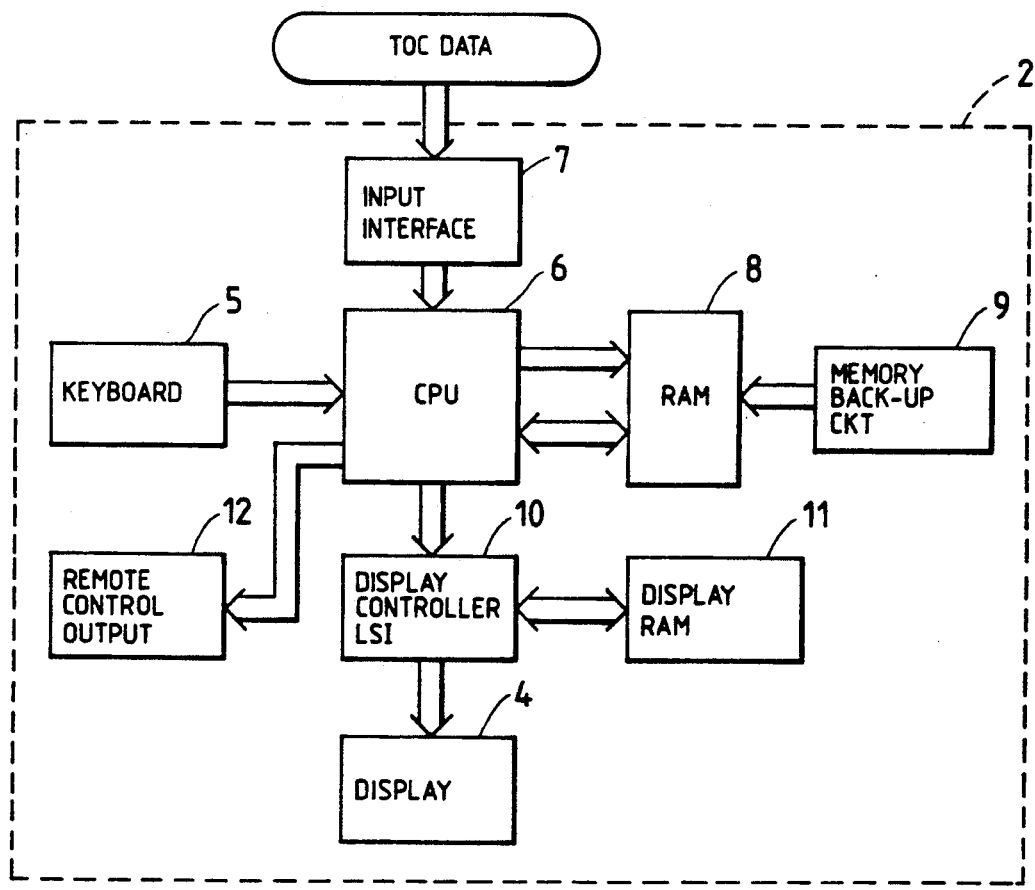
FIG. 4 is a block diagram showing the internal arrangement of the second embodiment of the invention.

The above-described disc data display unit may be provided with a remote control output section 12 as shown in FIGS. 3 and 4 so that, when the user performs a selecting operation by remote control while watching a disc title, music name, performance time, etc., the remote control output section 12 applies a remote control signal through a remote control signal transmitting cable 13 to the disc player 1, to thereby operate the disc player 1.

In the embodiment shown in FIGS. 3 and 4, the remote control signal is transmitted through the cable 13; however, a wireless (infrared-ray-operated) remote control unit may be used to transmit the remote control signal. In addition, the disc data display unit may be in the form of a hand-held disc data display unit so that the operator can operate the player 1 by remote control while watching the display section 4 at his side.

As was described in detail, the disc data display unit of the invention is used in combination with the disc player which is so designated as to be able to output data inherent to a disc, such as TOC data. In the display unit, data inherent to a disc are combined with data arbitrarily inputted by the user to form an electronic file, and therefore the user can select a piece of music he likes by referring to the display of the disc's inherent data and the arbitrary data. Thus, the provision of the disc data display unit of the invention is effective for use in controlling the disc player.

What is claimed is:

1. A data display unit for use in combination with a disc player, said disc player being adapted to play discs having data inherent therein, comprising:

first memory means for storing said inherent data in a file;

input means for user-inputting user-originated arbitrary data related to said inherent data and determined by a user into said first memory means;

processing means receiving said inherent data and said related user-inputted arbitrary data and controlling the formation of said file in said first memory means and for determining whether inherent data reproduced from a disc is stored in said first memory means each time a disc is loaded in said disc player;

display means for displaying said inherent data and said related user-inputted arbitrary data; and display control means for converting said inherent data and said related user-inputted arbitrary data into characters for display on said display means, said display control means operating under the control of said processing means;

said display control means and said display means reading and displaying said arbitrary data stored in said first memory means in connection with said inherent data when said processing means determines that inherent data reproduced from said disc is stored in said first memory means, wherein said arbitrary data includes descriptive words that corresponds with said inherent data, said correspondence being determined solely by the user.

2. A data display unit as claimed in claim 1, wherein said display means displays said characters converted from said inherent data and said related user-inputted arbitrary data simultaneously.

3. A data display unit as claimed in claim 2, further comprising:

second memory means connected to said first memory means for backing up said first memory means.

4. A data display unit as claimed in claim 2, further comprising:

display memory means for storing display characters, wherein said display control means reads said display characters from said display memory means according to said inherent data and said related user-inputted arbitrary data and displays said display characters on said display means.

5. A data display unit as claimed in claim 2, wherein said display means is a separate remote television monitor.

6. A data display unit as claimed in claim 2, further comprising a remote controlling section for control said display unit from a remote location.

7. A data display unit as claimed in claim 6, wherein said separate remote control section is connected to the remainder of said data display unit by a transmitting cable.

8. A data display unit as claimed in claim 6, wherein said separate remote control section is an infrared-ray operated remote control.

9. A data display unit as claimed in claim 2, wherein said data display unit is a hand-held unit.

* * * * *